United States Patent
Shi et al.

(10) Patent No.: US 9,184,667 B2
(45) Date of Patent: Nov. 10, 2015

(54) SWITCHING POWER CONVERTER WITH PRIMARY-SIDE DYNAMIC LOAD DETECTION AND PRIMARY-SIDE FEEDBACK AND CONTROL

(71) Applicant: iWatt Inc., Campbell, CA (US)

(72) Inventors: Fuqiang Shi, Oak Park, IL (US); John William Kesterson, Campbell, CA (US); Yong Li, San Jose, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 207 days.

(21) Appl. No.: 13/914,979

(22) Filed: Jun. 11, 2013

(65) Prior Publication Data
US 2014/0362612 A1 Dec. 11, 2014

(51) Int. Cl.
*H02M 3/335* (2006.01)

(52) U.S. Cl.
CPC ................................ *H02M 3/33523* (2013.01)

(58) Field of Classification Search
CPC ............ H02M 3/335; H02M 3/33507; H02M 3/33523; H02M 3/33592
USPC .............. 363/15, 16, 17, 21.04, 21.07, 21.08, 363/21.1, 21.12, 21.15, 21.16, 21.18, 97, 363/131
See application file for complete search history.

(56) References Cited

U.S. PATENT DOCUMENTS

| | | | |
|---|---|---|---|
| 2009/0279329 A1* | 11/2009 | Shen et al. | 363/52 |
| 2010/0054000 A1* | 3/2010 | Huynh | 363/21.16 |
| 2010/0309689 A1* | 12/2010 | Coulson | 363/16 |
| 2011/0096573 A1 | 4/2011 | Zhu et al. | |
| 2012/0147631 A1* | 6/2012 | Nate | 363/21.15 |
| 2014/0198539 A1* | 7/2014 | Lv et al. | 363/21.12 |
| 2014/0307484 A1* | 10/2014 | Yang | 363/21.12 |

OTHER PUBLICATIONS

German Office Action, German Application No. 102014210527.7, Feb. 4, 2015, 6 pages (with concise explanation of relevance).

* cited by examiner

*Primary Examiner* — Adolf Berhane
*Assistant Examiner* — Alex Torres-Rivera
(74) *Attorney, Agent, or Firm* — Fenwick & West LLP

(57) ABSTRACT

A switching power converter provides regulated voltage to a load. The switching power converter comprises a transformer including a first primary winding coupled to an input voltage, a second primary winding, a secondary winding coupled to an output of the switching power converter, and an auxiliary winding, a first switch coupled to the first primary winding, and a second switch coupled to the secondary primary winding. A controller generates a first control signal to turn the first switch on or off at a first switching frequency, and a second control signal to turn the second switch on or off at a second switching frequency that is higher than the first frequency. During off cycles of the switches, feedback voltage representing the output voltage of the power converter is generated across the auxiliary winding. The controller controls switching of the first switch to regulate the output voltage based on the feedback.

16 Claims, 6 Drawing Sheets

SWITCHING POWER CONVERTER WITH PRIMARY-SIDE DYNAMIC LOAD DETECTION AND PRIMARY-SIDE FEEDBACK AND CONTROL

BACKGROUND

This invention relates generally to a switching power supply and more particularly to dynamic load detection with primary-side sensing and feedback.

Conventional flyback power converters include a power stage for delivering electrical power from a power source to a load. A switch in the power stage electrically couples or decouples the load to the power source, and a switch controller coupled to the switch controls the on-time and off-time of the switch. The on-time and off-time of the switch may be modified by the controller based upon a feedback signal representing the output power, output voltage or output current to regulate the same. The energy is stored in the gap of a transformer when a switch is on and is transferred to the load when the switch is off. Regulation can be accomplished by, among other things, measuring the output current (or output voltage) and feeding that back to a primary side controller, which can be used to modify the on-time and off-time of the switch accordingly.

In order to improve cost performance and reduce over-all size, many commercially available isolated power supplies employ primary-only feedback and control. By sensing primary side signals during each ON and OFF cycle, the secondary output and load condition can be detected and thus be controlled and regulated. This includes both constant voltage and constant current modes of operation.

Many electronic devices require the power supply to provide a controlled and regulated power source over wide operating conditions, adding to the difficulty of primary-side sensing and control. Portable electronic devices such as smartphones and tablet computers are examples of such devices.

FIG. 1 illustrates an operating curve of an example switching power converter used to provide a controlled and regulated output to a load. Operating conditions presented to the switching power supply may occur while a load such as an electronic device is connected to the power supply or when a load is not connected. For example, in a Constant Voltage Mode (CVM) 101, the switching power supply supplies a regulated DC output of a fixed voltage within a certain tolerance range indicated by CVM range 104. CVM 101 generally indicates that the internal battery of the electronic device is fully charged and the fixed voltage output of the power supply provides the operating power for the electronic device to be operated normally.

In a Constant Current Mode (CCM) 102, the power supply provides a fixed current output. CCM 102 generally indicates that the internal battery of the electronic device is not fully charged and the constant current output of the power supply allows for the efficient charging of the internal battery of the electronic device.

Lastly, in a no-load condition 103, the electronic device is disconnected from the power supply. Under the no-load condition 103, the switching power supply may maintain a regulated voltage output within the CVM range 104 in anticipation of the electronic device being reconnected to the power supply.

For convenience, end users often leave the power supply connected to the AC mains at times where no load is connected to the power supply output. Because the power supply maintains a regulated output voltage even in no-load conditions, a dual-mode control methodology is commonly employed. During periods when there is a nominal load, pulse width modulation is employed. However, when the load approaches no load, it is difficult to maintain a duty-cycle low enough to maintain output regulation. Accordingly, a pre-load, or dummy load can be added, however, operational efficiency and no-load power consumption are negatively impacted. Furthermore, because power supplies are oftentimes connected to the AC-mains for long periods of time when they are not connected to the electronic device, government and environmental agencies have placed maximum limits on the no-load power consumption.

In such situations, one technique is for the controller to change its regulation mode under low load or no-load conditions. Under no-load conditions, the rate of the pulses that turn on or turn off the power switch of the switching power converter is decreased significantly in order to maintain output voltage regulation, resulting in long periods of time between ON and OFF cycles of the switching power converter. This presents a significant challenge to primary-side sensing control schemes that rely on the ON and OFF cycles of the power switch to obtain a feedback signal. During the periods between ON cycles of the switch, the status of the output voltage is unknown by the controller as no feedback signal is generated. If the electronic device is reconnected to the power supply, representing a dynamic load change, during one of the long OFF cycles of the switch, the primary-side controller does not receive feedback about the change in the secondary side output voltage until the next ON cycle of the switch. In the interim, the output voltage may therefore drop significantly, exceeding the allowable voltage drop specified by the regulation specifications.

SUMMARY

Embodiments described herein include a system and method for primary-side dynamic load detection in a switching power converter without negatively impacting no-load power consumption. The system and method include increasing the effective sensing frequency of the status of the output voltage, allowing for improved detection of dynamic conditions of the secondary output. Once the dynamic load condition is detected, the primary-side controller may take control actions to maintain output regulation. Furthermore, the increased sampling frequency has little impact on no-load power consumption or output regulation.

In one embodiment, a switching power converter comprises a transformer that includes a first primary winding coupled to an input voltage, a second primary winding, a secondary winding coupled to an output of the switching power converter, and an auxiliary winding on a primary side of the transformer. Output voltage across the secondary winding is reflected as feedback voltage across the auxiliary winding. A first switch is coupled to the primary winding of the transformer, such that current in the primary winding is generated responsive to the first switch being turned on and not generated responsive to the first switch being turned off. A second switch is coupled to the second primary winding of the transformer, such that current in the second primary winding is generated responsive to the second switch being turned on and not being generated responsive to the second switch being turned off. The feedback voltage across the auxiliary winding is generated during off-cycles of the first switch and during off-cycles of the second switch.

A controller coupled to the first switch and the second switch generates a first control signal to turn on or turn off the first switch at a first switching frequency and generates a second control signal to turn on or turn off the second switch at a second switching frequency. The second switching frequency is higher than the first switching frequency.

The second switch enables sensing of the secondary output voltage via the primary-side auxiliary winding during off cycles of the first switch. During light or no-load operating conditions, the first switching frequency is reduced in order to maintain output voltage regulation. As a result, the length of time between 'ON' and 'OFF' switching cycles of the first switch increases. In one embodiment, when the length of time between switching cycles of the first switch exceeds a time threshold (that is, when the first switching frequency drops below a threshold), the controller initiates 'ON' and 'OFF' cycles of the second switch in order to sense the feedback voltage across the primary-side auxiliary winding. In one embodiment, the second switch is powered by a voltage that is lower than the input voltage, and thus the switching losses during and 'ON' and 'OFF' cycle of the second switch are smaller than switching losses of the first switch.

Embodiments described herein further relate to detecting dynamic load conditions occurring during OFF cycles of the first switch, and activating the first switch when a drop in the output voltage is detected. Accordingly, the dynamic load detection scheme herein minimally impacts power consumption, including during no-load operation, while providing reliable control of the output voltage of the switching power converter.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Embodiments of switching power converters described herein may be configured to (1) increase the primary side sensing frequency to the secondary side output voltage to detect when a dynamic load is placed on the secondary output, (2) signal the primary-side controller of the occurrence of a dynamic load, without impacting the feedback or regulation control loop, thus not impacting loop stability, and without increasing no-load power consumption. The controller regulates the output voltage by modifying the on and off times of the power switch based on the primary-side feedback voltage.

Primary-Side Dynamic Load Detection

Figure 1:
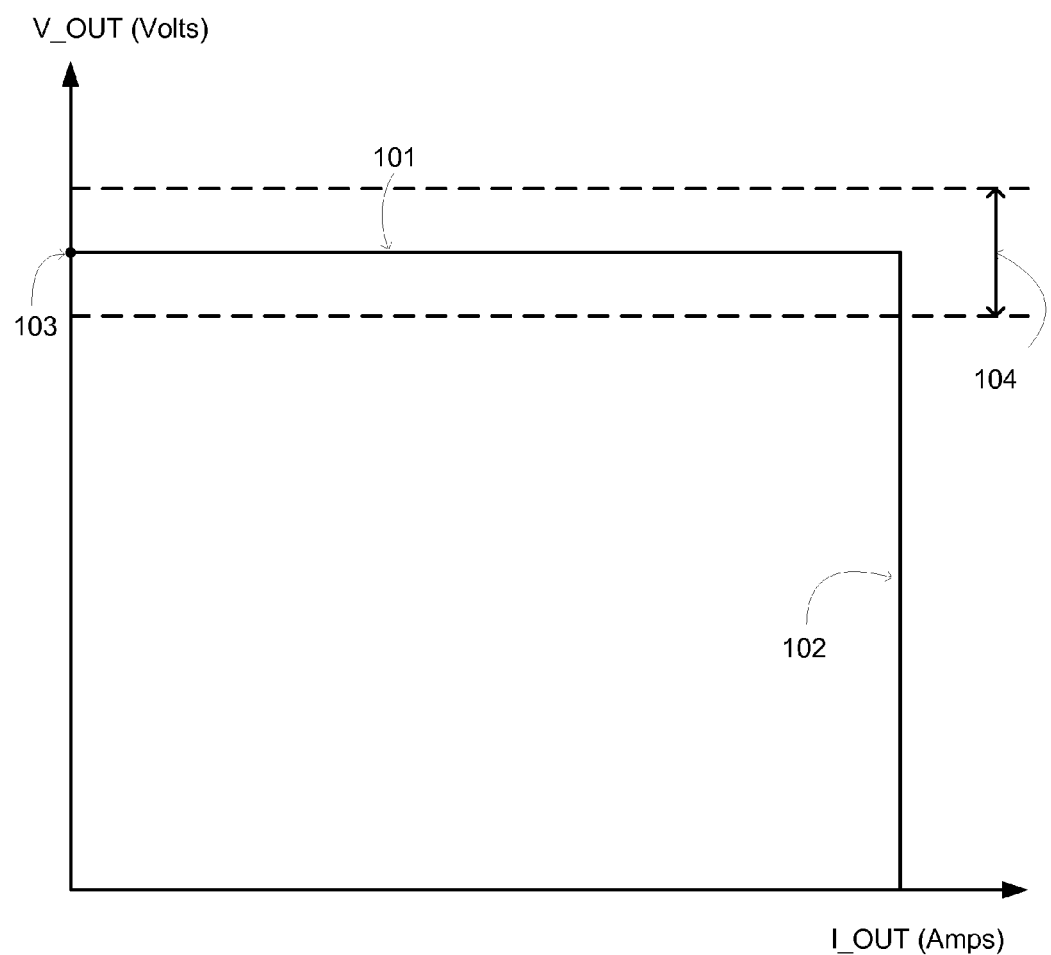
FIG. 1 illustrates an operating curve of an example switching power converter used to provide a controlled and regulated output to a load.
Figure 2A:
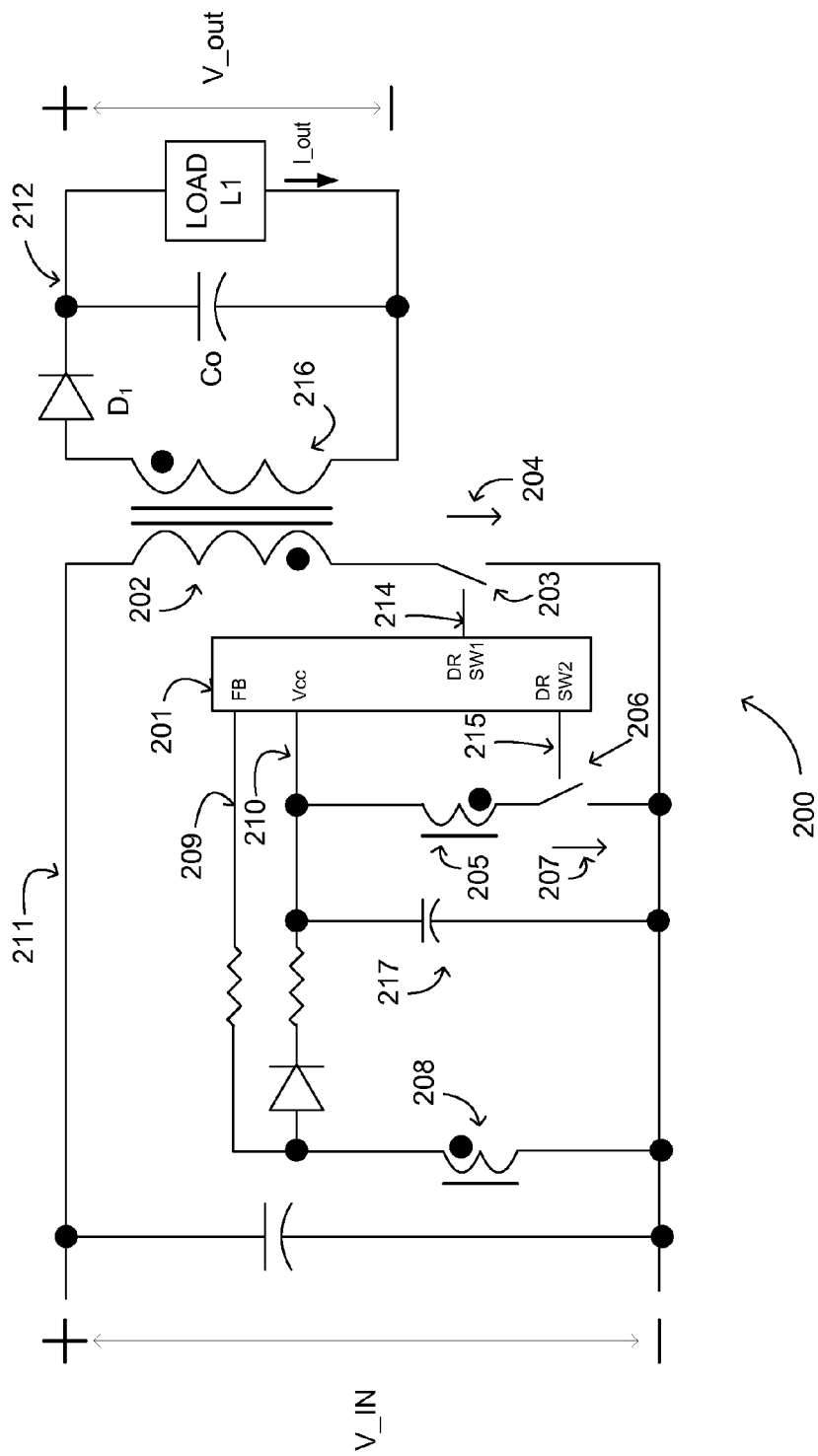
FIG. 2A illustrates one embodiment of a power converter with primary-side dynamic load detection and primary-side feedback and control.
Figure 2B:
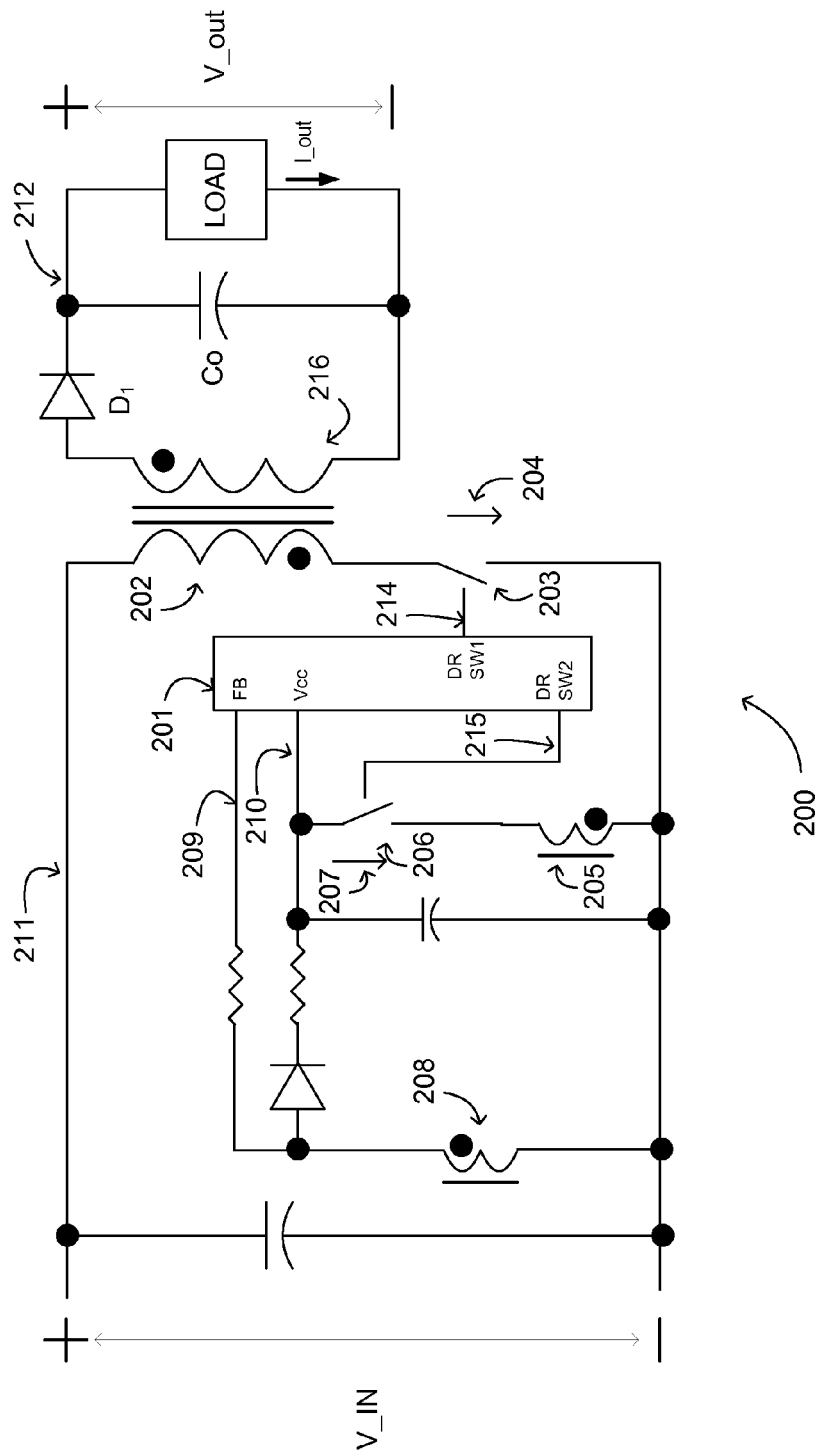
FIG. 2B illustrates an alternative embodiment of a power converter with primary-side dynamic load detection and primary-side feedback and control.

FIGS. 2A and 2B illustrate example embodiments of a switching power converter 200 with primary-side dynamic load detection and primary-side feedback and control. The switching power converter 200 includes, among other components, a transformer with primary windings 202 and 205, secondary winding 216, and auxiliary winding 208, switches 203 and 206, and controller 201.

Power converter 200 receives AC power from an AC power source (not shown), which is rectified to provide the regulated DC input voltage V_IN. Input voltage V_IN is coupled to primary winding 202. During ON cycles of switch 203, energy is stored in primary winding 202 because the diode $D_1$ is reverse biased. The energy stored in primary winding 202 is released to secondary winding 216 and transferred to the load L1 across the capacitor $C_O$ during the OFF cycles of switch 203 because the diode $D_1$ becomes forward biased. Diode $D_1$ rectifies the output voltage on the secondary winding 216 and capacitor $C_o$ filters the output voltage on the secondary winding 216 for outputting as output voltage 212 across load L1. During the OFF cycles of switch 203, output voltage 212 is reflected as feedback voltage 209 across auxiliary winding 208.

Figure 2C:
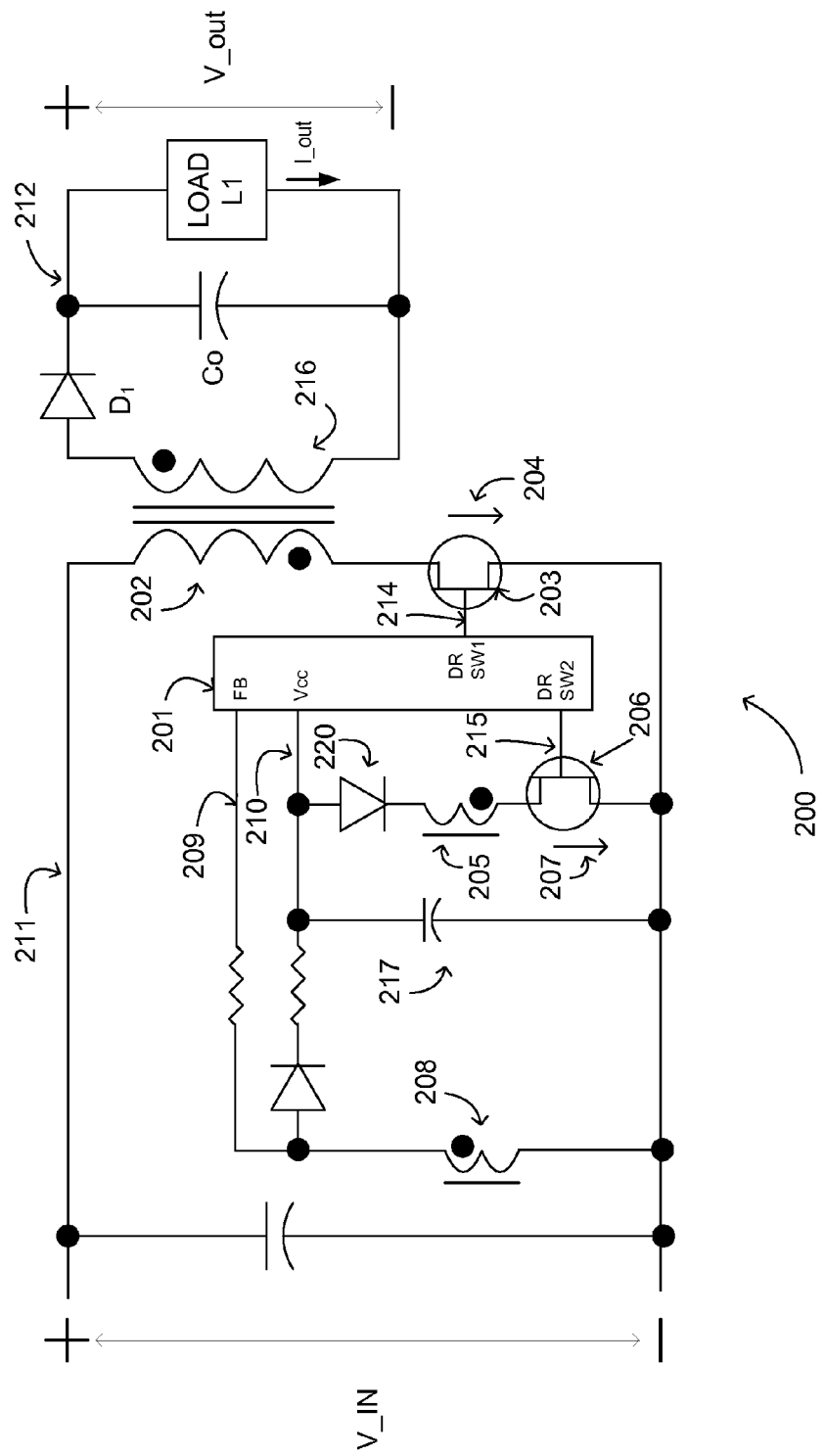
FIG. 2C illustrates another alternative embodiment of a power converter with primary-side dynamic load detection and primary-side feedback and control.

Capacitor 217 is coupled to auxiliary winding 208 and charged during OFF cycles of switches 203 and 206. In FIG. 2A, switch 206 is coupled to primary winding 205, which is powered by voltage 210 across capacitor 217. In an alternative embodiment, as illustrated in FIG. 2B, switch 206 is placed on the high side of primary winding 205. In the example illustrated in FIGS. 2A and 2B, voltage 210 is additionally the Vcc input voltage source for primary-side controller 201, but any low voltage source may be employed. FIG. 2A and 2B illustrate switches 203 and 206 as ideal switches, but switches 203 and 206 may be implemented as MOSFET switches, bipolar junction transistors, or as any other type of switch. For example, FIG. 2C illustrates switches 203, 206 implemented as MOSFET switches. Diode 220, in series with switch 206, rectifies the current through switch 206.

Primary-side controller 201 generates the control signal 214 to turn on or turn off switch 203 at a first switching frequency, and generates the control signal 215 to turn on or turn off switch 206 at a second switching frequency. The second switching frequency is higher than the first switching frequency, for example, by orders of magnitude. In one embodiment, the controller 201 initiates 'ON' and 'OFF' cycles of the switch 206 in order to sense the feedback voltage across the primary-side auxiliary winding 208 only when the length of time between switching cycles of the first switch exceeds a time threshold (that is, when the first switching frequency drops below a predetermined threshold). Controller 201 regulates output voltage 212 based at least in part on the feedback voltage 209. Controller 201 can employ any one of a number of modulation techniques, such as pulse-width-modulation (PWM) or pulse-frequency-modulation (PFM), to control the ON and OFF states and duty cycles of power switch 203 based on the feedback voltage 209 for regulating output voltage 212.

Under light load or no load conditions, controller 201 may operate in PFM and reduce the switching frequency of switch 203 in order to maintain regulation of output voltage 212. As the first switching frequency decreases, the time between feedback signals 209 of the reflected waveform across auxiliary winding 208 due to the OFF cycles of switch 203 increases. In order to maintain a minimum feedback sampling frequency as the first switching frequency is decreased, controller 201 initiates ON and OFF cycles of switch 206 through control signal 215. At each OFF cycle of switch 203 and switch 206, the controller 201 receives the feedback signal 209 representing the status of output voltage 212. Accordingly, controller 201 receives the feedback voltage 209 multiple times during a single OFF cycle of the first switch 203 and thereby improves the overall regulation performance of output voltage 212. For example, feedback voltage 209 due to the OFF cycles of switch 206 can provide an indication of a dynamic load condition that occurs during an OFF cycle of switch 203.

Moreover, because primary winding 205 and switch 206 are powered by voltage 210, which is lower than input voltage V_IN, the energy transferred to the secondary winding of the transformer during each ON and OFF cycle of switch 206 may be negligible and therefore may not impact regulation of output voltage 212. Furthermore, because switch 203 may have a large parasitic capacitance to accommodate a high voltage, power losses in turning on and turning off switch 203 may be relatively high. The switching losses (Psw) in each switch are due to the capacitance of the switch (Csw) as well as the primary winding capacitance (Cprim) and can be represented by:

$$Psw = 0.5 \times Csw \times (Vin + N \times V\_out)^2 \times Fsw,$$

where
  Csw=Transistor capacitance plus primary winding capacitance;
  Vin=Input voltage (VDC);
  N=Primary to secondary winding turns ratio;
  Fsw=Switching frequency.
For example, if V_IN in FIG. 2A is 300 VDC and voltage 210 is 10 VDC, the switching losses in switch 206 may be significantly lower than the switching losses in switch 203, depending on the values of the other parameters. Therefore, the low voltage switch 206 may reduce switching losses and the resulting no-load power consumption.

Figure 3:
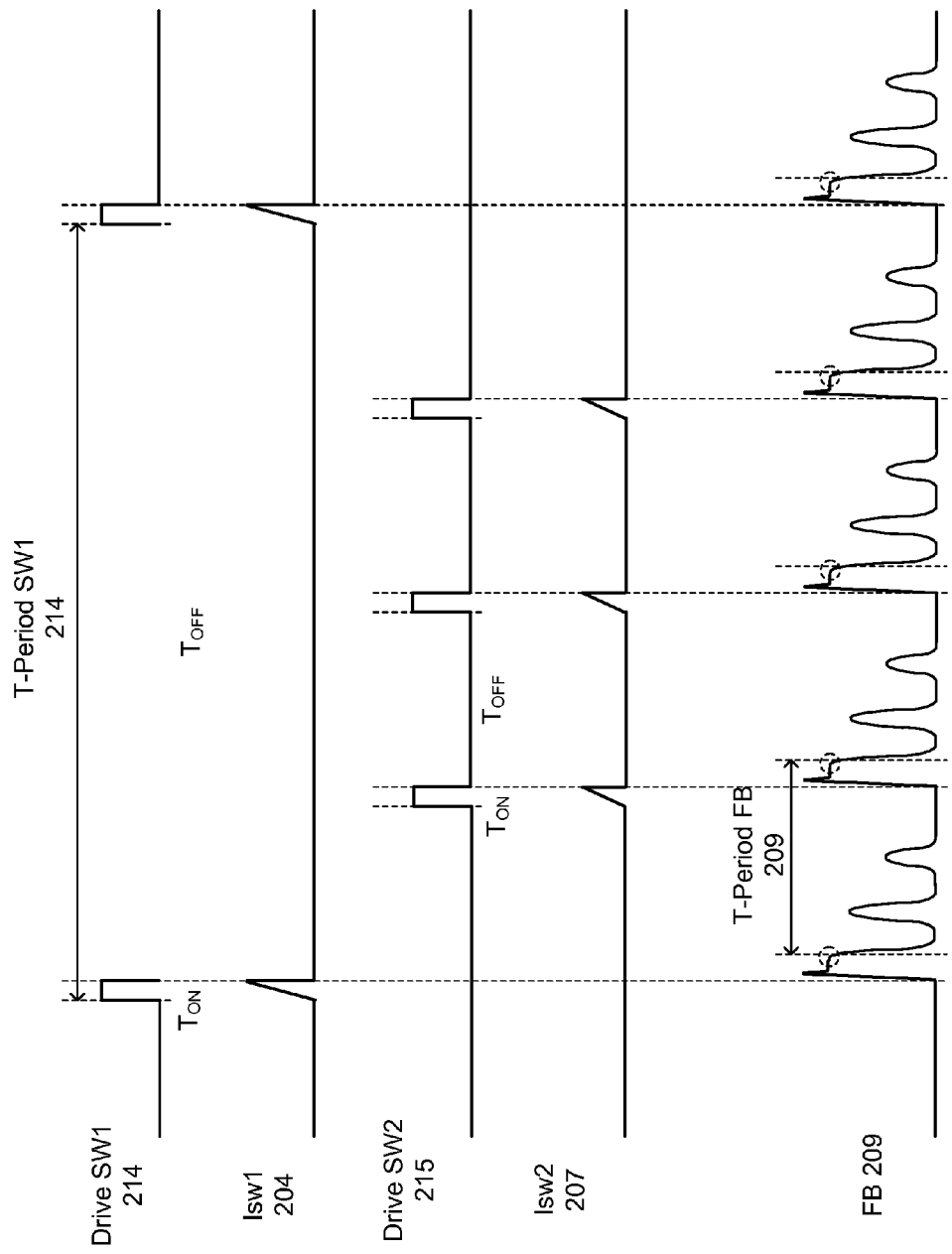
FIG. 3 illustrates example waveforms corresponding to an example power converter with primary-side dynamic load detection and primary-side feedback and control.

FIG. 3 illustrates example waveforms of embodiments of switching power converter 200 as described herein. Illustrated are drive signal SW1 214 for switch 203 and the corresponding primary current Isw1 204 through primary winding 202 during the ON cycle of switch 203. When switch 203 is placed into the OFF cycle, controller 201 receives feedback by sampling feedback voltage 209 across auxiliary winding 208 at knee voltage 305. FIG. 3 also illustrates drive signal SW2 215 for switch 206 and the corresponding primary current Isw2 207 through primary winding 205 during the ON cycle of switch 206. When switch 206 is placed into the OFF cycle, controller 201 also receives feedback by sampling feedback voltage 209 across auxiliary winding 208 at knee voltage 305. As shown in FIG. 3, the feedback sampling period 310 and resulting sampling frequency of signal 209 includes ON and OFF cycles of both switch 203 and switch 206. Thus, controller 201 receives the feedback voltage multiple times during each OFF cycle of switch 203, and the resulting sampling frequency is much greater than the switching frequency of switch 203.

Figure 4A:
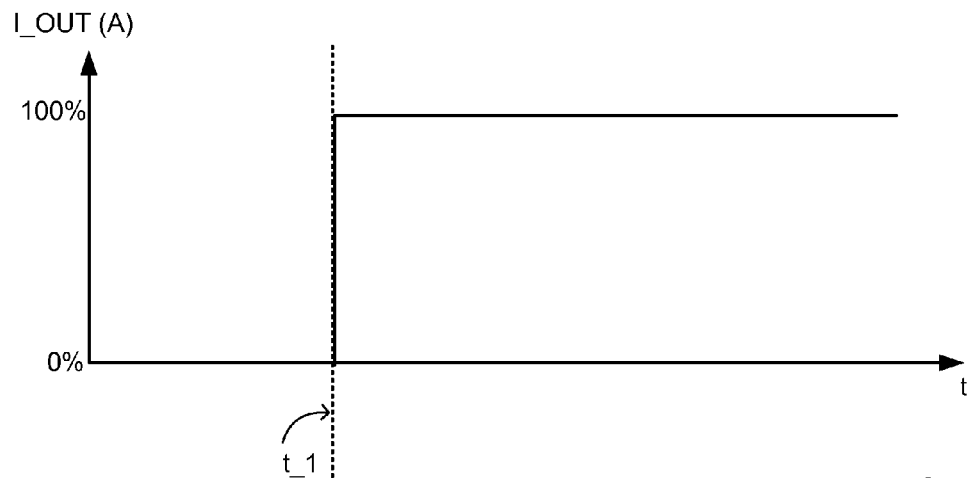
FIGS. 4A and 4B illustrate example waveforms corresponding to an example power converter with primary-side dynamic load detection and primary-side feedback and control.
Figure 4B:
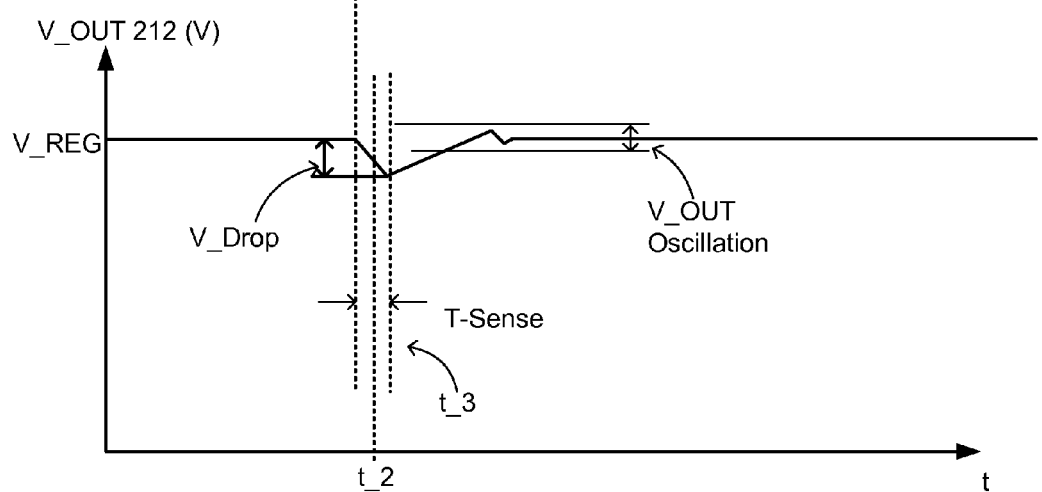

FIGS. 4A and 4B illustrate the resulting dynamic load response of switching power converter 200. A 0% to 100% dynamic load is placed on switching power converter 200 at time t_1. At time t_2, during an OFF cycle of switch 206, controller 201 samples the feedback signal as soon as the first OFF cycle of switch 206 occurs after time t_1. Based on the obtained feedback signal FB 209, controller 201 determines that output voltage 212 has dropped due to an increase in the output load. At time $t_3$, controller 201 initiates ON and OFF switching cycles of switch 203 in response to the increase in output load. During the time T_sense between t_1 and t_3, output voltage 212 falls by V_drop. In one embodiment, the switching frequency of switch 206 is set as a constant value to meet a constraint on V_drop or T_sense. Since the switching frequency of switch 206 is much higher than the switching frequency of switch 203, the switching power converter is capable of limiting the voltage drop V_drop to a much smaller value than what it would be when V_drop is sensed only at the switching frequency of switch 203.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

Upon reading this disclosure, those of skill in the art will appreciate still additional alternative designs for the system. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in any claims drawn to the subject matter herein.

What is claimed is:
1. A switching power converter comprising:
  a transformer including a first primary winding coupled to an input voltage, a second primary winding, a secondary winding coupled to an output of the switching power converter, and an auxiliary winding on a primary side of the transformer, output voltage across the secondary winding being reflected as feedback voltage across the auxiliary winding;
  a first switch coupled to the first primary winding of the transformer, current in the primary winding being generated responsive to the first switch being turned on and not generated responsive to the first switch being turned off, the feedback voltage being generated across the auxiliary winding during off-cycles of the first switch;

a second switch coupled to the second primary winding of the transformer, current in the second primary winding being generated responsive to the second switch being turned on and not being generated responsive to the second switch being turned off, the feedback voltage being also generated across the auxiliary winding during off-cycles of the second switch; and a controller coupled to the first switch and the second switch, the controller being configured to generate a first control signal to turn on or turn off the first switch at a first switching frequency and, responsive to the first switching frequency dropping below a threshold frequency, generate a second control signal to turn on or turn off the second switch at a second switching frequency that is higher than the first frequency.

2. The switching power converter of claim 1, wherein the controller is further configured to regulate turning on or off the first switch at least in part based on the feedback voltage generated during off-cycles of the first switch and the second switch at the second frequency.

3. The switching power converter of claim 1, wherein the second switch is powered by a voltage that is lower than the input voltage.

4. The switching power converter of claim 3, further comprising a capacitor coupled to the auxiliary winding, the capacitor being charged during the off-cycles of the first switch and the second switch, and the second switch being powered by a voltage across the capacitor.

5. The switching power converter of claim 4, wherein a first switching loss during one switching cycle of the first switch is larger than a second switching loss during one switching cycle of the second switch.

6. The switching power converter of claim 1, wherein the controller is configured to generate the second control signal, while the controller generates the first control signal to control the first switch using pulse frequency modulation.

7. The switching power converter of claim 1, wherein the controller is configured to receive the feedback voltage multiple times during a single off-cycle of the first switch.

8. A switching power converter comprising:

a transformer including a primary winding coupled to an input voltage, a secondary winding coupled to an output of the switching power converter, and an auxiliary winding on a primary side of the transformer, output voltage across the secondary winding being reflected as feedback voltage across the auxiliary winding;

a switch coupled to the primary winding of the transformer, current in the primary winding being generated responsive to the switch being turned on and not generated responsive to the switch being turned off;

a controller coupled to the switch and configured to generate a control signal to turn on or turn off the switch at a switching frequency, wherein the controller is further configured to, responsive to the switching frequency dropping below a threshold frequency, determine the feedback voltage multiple times during a single off-cycle of the switch.

9. A method for controlling a switching power converter, the switching power converter including a transformer with a first primary winding coupled to an input voltage, a second primary winding, a secondary winding coupled to an output of the switching power converter, and an auxiliary winding on a primary side of the transformer, output voltage across the secondary winding being reflected as feedback voltage across the auxiliary winding, a first switch coupled to the first primary winding of the transformer, and a second switch coupled to the second primary winding of the transformer, the method comprising:

generating a first control signal to turn on or turn off the first switch at a first switching frequency;

responsive to the first control signal dropping below a threshold frequency, generating a second control signal to turn on or turn off the second switch at a second switching frequency that is higher than the first switching frequency; and determining the feedback voltage in each off cycle of the second switch.

10. The method of claim 9, further comprising regulating turning on or off the first switch based at least in part on the feedback voltage generated during off-cycles of the first switch and the second switch at the second frequency.

11. The method of claim 9, wherein the second switch is powered by a voltage that is lower than the input voltage.

12. The method of claim 11, wherein the switching power converter further comprises a capacitor coupled to the auxiliary winding, and the method further comprises charging the capacitor during the off-cycles of the first switch and the second switch, the second switch being powered by the voltage across the capacitor.

13. The method of claim 12, wherein a first switching loss during one switching cycle of the first switch is larger than a second switching loss during one switching cycle of the second switch.

14. The method of claim 9, further comprising generating the second control signal, while generating the first control signal to control the first switch using pulse frequency modulation.

15. The method of claim 9, further comprising receiving the feedback voltage multiple times during a single off-cycle of the first switch.

16. A method for controlling a switching power converter, the switching power converter including a transformer with a first primary winding coupled to an input voltage, a second primary winding, a secondary winding coupled to an output of the switching power converter, and an auxiliary winding on a primary side of the transformer, output voltage across the secondary winding being reflected as feedback voltage across the auxiliary winding, the switching power converter also including a switch coupled to the first primary winding of the transformer, the method comprising:

generating a control signal to turn on and turn off the switch at a switching frequency; and responsive to the switching frequency dropping below a threshold frequency, determining the feedback voltage multiple times during a single off-cycle of the switch.

* * * * *